United States Patent
Bildsoe

[15] 3,685,637
[45] Aug. 22, 1972

[54] PALLET
[72] Inventor: Jorgen S. Bildsoe, Royal Oak, Mich.
[73] Assignee: Seatech Engineering, Inc.
[22] Filed: July 17, 1970
[21] Appl. No.: 55,918

[52] U.S. Cl. ..................198/189, 161/244, 161/87, 108/51
[51] Int. Cl. ...........................................B65g 17/00
[58] Field of Search ............108/57, 66, 51; 264/261; 198/189, 181; 161/36-38

[56] References Cited

UNITED STATES PATENTS

| | | | |
|---|---|---|---|
| 3,324,930 | 6/1967 | Colombo | 16/150 |
| 3,481,810 | 12/1969 | Waite | 264/261 |
| 3,388,611 | 6/1968 | Clary et al. | 16/150 |

Primary Examiner—Bobby R. Gay
Assistant Examiner—Garry Moore
Attorney—Harness, Dickey & Pierce

[57] ABSTRACT

An improved conveyor assembly for conveying pallets along an irregular path. The pallets are of a two-piece design and a resilient covering material provides a protective load supporting surface for the pallets and hingedly connects the pallet sections together. The pallet sections are formed of such a configuration that they may be formed from a single, rectangular sheet of material.

7 Claims, 6 Drawing Figures

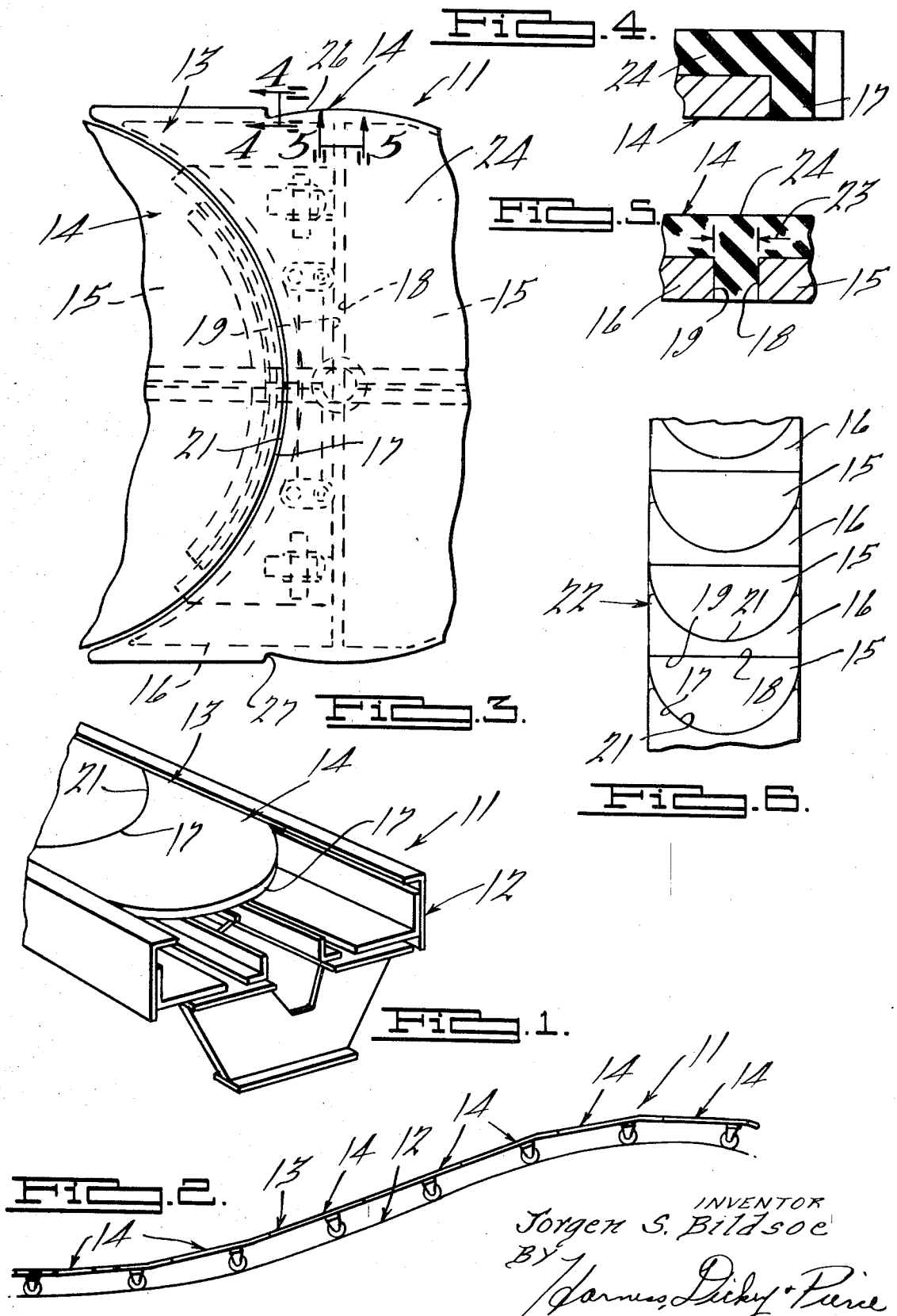

3,685,637

PALLET

CROSS REFERENCE TO RELATED APPLICATION

This application is related to my copending application entitled "Conveyor," Ser. No. 751,935, filed Aug. 12, 1968 now U.S. Pat. No. 3554360.

BACKGROUND OF THE INVENTION

This invention relates to an improved pallet for a conveyor system and more particularly to an improved, articulated pallet.

In my aforenoted, copending application two embodiments of conveyor assemblies are shown. In each embodiment, the conveyor assembly is adapted to transport a plurality of interconnected pallets along an irregular path. In one embodiment, the path may be irregular in two planes. For example, the pallets may move along a vertical incline. In order to accomplish this movement, the pallets are comprised of two members that are hingedly connected together. Although the embodiment disclosed in that application is satisfactory, the addition of the hinges to the assembly adds some cost.

It is, therefore, a principal object of this invention to provide an improved, simplified articulated pallet for a conveyor system.

It is another object of the invention to provide an articulated pallet that does not employ hinges as such.

It is a further object of the invention to provide a pallet for a conveyor system that is adapted to be moved along an irregular path.

It is yet another object of the invention to provide a two section pallet in which a resilient covering forms a load carrying surface for the pallet and also serves as the hinge for joining the pallet sections together.

SUMMARY OF THE INVENTION

This invention is adapted to be embodied in a pallet for a conveyor system, which system is adapted to convey the pallet along an irregular path. The pallet has first and second relatively rigid members that are adapted to support a load thereupon. The members are juxtaposed to each other along adjacent edges and a common resilient covering is affixed to each of the members and spans at least in part the edges. The resilient covering has sufficient flexibility to serve as a hinge for pivotally connecting the members.

BRIEF DESCRIPTION OF THE DRAWINGS

FIG. 1 is a perspective view showing a section of a conveyor assembly embodying the invention.

FIG. 2 is a schematic side elevational view of a portion of the conveyor assembly.

FIG. 3 is an enlarged top plan view of a portion of the conveyor assembly and particularly illustrating a portion of the load carrying pallets of the assembly.

FIG. 4 is an enlarged cross-sectional view taken along the line 4—4 in FIG. 3.

FIG. 5 is an enlarged cross-sectional view taken along the line 5—5 of FIG. 3.

FIG. 6 is a view, on a reduced scale, showing the manner in which a number of pallets may be formed from a single strip of material.

DETAILED DESCRIPTION OF THE PREFERRED EMBODIMENT

In the drawings, the reference numeral 11 indicates generally a conveyor system embodying this invention. The conveyor system is comprised of a support structure 12 that defines a path along which a train of pallets, indicated generally by the reference numeral 13, is transported. The supporting structure 12 and the structure for driving the train of pallets 13 may be the same as that described in my aforenoted, copending patent application. Since this portion of the structure forms no part of this invention, it will not be described in detail. The disclosure of my aforenoted application is herein incorporated by way of reference for a description of the supporting and drive structures.

The supporting structure 12 and the drive system is adapted to drive the train of pallets 13 along an irregular path that is curved both in a horizontal plane and which is curved in a vertical plane as clearly shown in FIG. 2.

Referring now specifically to the construction of the pallets of the train 13, each pallet, indicated generally by the reference numeral 14, is comprised of a first section 15 and a second section 16, which sections are joined together in a manner which will become more apparent as this description proceeds. The section 15 has an arcuately curved leading section 17 and a linear trailing edge 18. The section 16 has a linear leading edge 19 that is juxtaposed to the trailing edge 18 of the section 15 and an arcuately curved trailing edge 21. The radius of curvature of the trailing edge 21 is equal to the radius of the leading edge 17 of the section 15.

The pallets 14 are connected to each other in the train 13 in an articulated fashion, as is also described in my aforenoted copending application. Since the manner in which the pallets 14 are interconnected with each other forms no part of this invention and since the invention may be used with a variety of methods of connecting the pallets 14 together, the interconnecting structure will not be described in detail. Reference may be had to my aforenoted copending application for the disclosure of a method for so interconnecting the pallets. The interconnection between adjacent pallets 14 permits the pallets to swing or pivot relative to each other about the respective arcuate surfaces 17 and 21. This curvature permits the train 13 to follow an arcuate path as viewed in a horizontal plane.

FIG. 6 illustrates a convenient way in which the pallets 17 may be formed from a single strip of material, indicated generally by the reference numeral 22 in this figure. Due to the configuration employed, the individual pallets may be made without any waste of material. Both the arcuate and straight edges 17, 21 and 18, 19 may be flame or otherwise cut from the strip 22. Since the sides of the pallets 14 are straight, the desired shape is formed with a minimum number of cutting operations and without any wastage of material as this figure clearly reveals.

After the sections 15 and 16 are cut they may be placed in a suitable mold (not shown) so that the edges 18 and 19 are spaced apart from each other at a gap indicated by the dimension 23 in FIG. 5. At this time, an elastomeric covering 24 is poured into the mold and covers the entire upper surfaces of the sections 15 and 16, surrounds their peripheral edges (FIG. 4) and fills the gap between the edges 18 and 19. After the elastomeric material 24 sets, it will be rigidly bonded to the surfaces 15 and 16 and due to its resilience will form a hinge between these sections. This permits the sections 15 and 16 to pivot relative to each other about a hinge axis to facilitate movement of the pallets 15 along a path that is curved in a vertical direction as shown in FIG. 2. In addition, the covering 24 provides a surface upon which article to be conveyed may be supported and insures against damage to these articles. If desired, the upper surfaces of the elastomeric material 24 may be provided with a non-skid type finish in any known manner. Due to the fact that the exposed surfaces of the sections 15 and 16 are completely covered by the elastomeric material 24 no high degree of surface finishing on either the upper or edge surfaces of the plates which form these sections 15 and 16 is necessary. Thus, the overall cost is reduced significantly since relatively low cost material may be used and since separate hinges are not required.

It has been previously noted that the base sections 15 and 16 are formed from a straight sided strip. In order to permit a wider degree of pivotal movement of the pallets 14 relative to each other about the curved surfaces 17 and 21, the mold into which the elastomeric covering is poured is formed so that the curved surface 17 extends along the configuration as shown in detail in FIG. 3. As a result, a notch or cutout 27 results at the intersection of the curved surface with the straight sides. This will obviously permit a greater degree of pivotal movement than if a uniform coating of elastomeric material 24 were applied. The described shape may be formed, however, without any waste of the base material on which the coating 24 is applied.

It is to be understood that the foregoing description is that of a preferred embodiment and the invention is susceptible of changes and modifications without departing from the spirit and scope thereof, as defined by the appended claims.

What is claimed is:

1. A pallet for a conveyor system adapted to convey the pallet along an irregular path or the like, said pallet having first and second relatively rigid members each having a surface adapted to support a load thereupon, said first and said second members being juxtaposed to each other along adjacent edges, and a common resilient covering affixed to each of said surfaces and spanning at least in part said edges, said resilient covering having sufficient flexibility to serve as a hinge for pivotally connecting said members.

2. A pallet as set forth in claim 1 wherein the resilient covering extends across the entirety of each of said surfaces of the members and completely fills the gap therebetween.

3. A pallet as set forth in claim 2 wherein the resilient material covers all of the peripheral edges of the members.

4. A pallet as set forth in claim 1 wherein the resilient material fills the space between the edges of the members and has a thickness at least equal to the thickness of the members.

5. A pallet as set forth in claim 1 wherein the pallet has an arcuate curved leading edge on the first member and an arcuate curved trailing edge on the second member, the radius of curvature of said leading and trailing edges being equal.

6. A pallet as set forth in claim 5 wherein the adjacent edges of the members are linear and in which the members form a rectangle when the trailing edge of the second member is juxtaposed to the leading edge of the first member.

7. A pallet as set forth in claim 6 wherein the resilient covering extends across the entirety of each of said surfaces of the members and along all of the edges of each of said members.

* * * * *